United States Patent
Zhao et al.

(10) Patent No.: US 11,645,233 B2
(45) Date of Patent: May 9, 2023

(54) DISTRIBUTED FILE CACHE

(71) Applicant: International Business Machines Corporation, Armonk, NY (US)

(72) Inventors: Cheng Yong Zhao, Shanghai (CN); Jia Min Li, Shanghai (CN); Zhong Shi Lu, Shanghai (CN); Ze Rui Yuan, Shanghai (CN); Yan Liang Qiao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 16/523,535

(22) Filed: Jul. 26, 2019

(65) Prior Publication Data

US 2021/0026808 A1    Jan. 28, 2021

(51) Int. Cl.
*G06F 16/172* (2019.01)
*G06F 16/13* (2019.01)
*G06F 16/182* (2019.01)

(52) U.S. Cl.
CPC .......... *G06F 16/172* (2019.01); *G06F 16/134* (2019.01); *G06F 16/137* (2019.01); *G06F 16/182* (2019.01)

(58) Field of Classification Search
CPC .......... G01R 31/08; H04L 12/56; H04L 9/08; G06Q 20/40; G06F 17/30; G06F 21/602; G06F 16/172; G06F 16/134; G06F 16/137; G06F 16/182; G06F 3/06
USPC .................................. 370/229, 395; 711/118
See application file for complete search history.

(56) References Cited

U.S. PATENT DOCUMENTS

| | | | |
|---|---|---|---|
| 7,945,544 B2 | 5/2011 | Farber | |
| 9,769,280 B2 | 9/2017 | Gupta | |
| 10,061,834 B1* | 8/2018 | Kulesza | ................. G06F 16/27 |
| 2003/0101267 A1 | 5/2003 | Thompson | |

(Continued)

FOREIGN PATENT DOCUMENTS

WO    2011044287 A1    4/2011

OTHER PUBLICATIONS

Freedman, Michael; David Mazieres. Sloppy Hashing and Self-Organizing Clusters, New York University Department of Computer Science (2003) (Year: 2003).*

(Continued)

*Primary Examiner* — Michael Krofcheck
(74) *Attorney, Agent, or Firm* — Gilbert Harmon, Jr.; Daniel R. Simek

(57) ABSTRACT

Embodiments of the present invention relate to methods, systems, and computer program products for file management in a distributed file cache system. In some embodiments, a method is disclosed. According to the method, responsive to determining that at least one client node is obtaining a file of a first version stored at a storage node, one or more processors generate contact information indicating that the file of the first version is accessible from the storage node and the at least one client node and recorded the contact information into a distributed hash table. The storage node and the at least one client node are included in a plurality of nodes associated with the distributed hash table. Further, one or more processors generate first version information indicating that the file is of the first version and record the first version information into a blockchain associated with the plurality of nodes.

20 Claims, 16 Drawing Sheets

(56) References Cited

U.S. PATENT DOCUMENTS

| | | | | |
|---|---|---|---|---|
| 2005/0201278 A1* | 9/2005 | Banerjee | ................ | H04L 45/48 |
| | | | | 370/408 |
| 2007/0002869 A1* | 1/2007 | Miller | ................ | H04L 61/1547 |
| | | | | 370/395.32 |
| 2016/0098723 A1* | 4/2016 | Feeney | ................ | G06Q 20/065 |
| | | | | 705/75 |
| 2020/0153627 A1* | 5/2020 | Wentz | ................... | H04L 9/3218 |

OTHER PUBLICATIONS

Eshel et al., "Panache: A Parallel File System Cache for Global File Access", IBM Almaden Research, 14 pps., printed on Apr. 29, 2019, <https://www.usenix.org/legacy/event/fast10/tech/full_papers/eshel.pdf>.

Freedman et al., "Sloppy hashing and self-organizing clusters", 6 pps., printed on Apr. 29, 2019, <http://www.coralcdn.org/docs/coral-iptps03.pdf>.

Mell et al., "The NIST Definition of Cloud Computing", National Institute of Standards and Technology, U.S. Department of Commerce, NIST Special Publication 800-145, Sep. 2011, 7 pages.

\* cited by examiner

DISTRIBUTED FILE CACHE

BACKGROUND OF THE INVENTION

The present disclosure generally relates to distributed system management, and more specifically, to file management in a distributed file cache system.

A distributed cache is an extension of the traditional concept of the cache used in a single locale. The distributed cache is a method of configuring a cache to span multiple nodes (e.g., physical machines or virtual machines) in a distributed system, so as to enable quick file retrieval. Some traditional schemes implement a distributed file cache system that includes a storage node for storing files persistently and a plurality of client nodes, which are coupled to the storage node for caching files.

SUMMARY

In a first aspect, embodiments of the present disclosure provide a method of file management. The method comprises, in response to determining that at least one client node is obtaining a file of a first version stored at a storage node, generating contact information indicating that the file of the first version is accessible from the storage node and the at least one client node. The method further comprises recording the contact information into a distributed hash table associated with a plurality of nodes including the storage node and the at least one client node. The method further comprises generating first version information indicating that the file is of the first version. In addition, the method comprises recording the first version information into a blockchain associated with the plurality of nodes.

In a second aspect, embodiments of the present disclosure provide a method of file management. The method comprises receiving a first request to access a file from a user at a client node. The method further comprises obtaining first version information about the file from a blockchain associated with a plurality of nodes including the client node, the first version information indicating that the file is of a first version. The method further comprises determining a set of nodes from which the file of the first version is accessible based on a distributed hash table associated with the plurality of nodes, the set of nodes being included in the plurality of nodes. In addition, the method comprises obtaining the file of the first version from at least one node in the set of nodes.

It is to be understood that the summary is not intended to identify key or essential features of embodiments of the present invention, nor is it intended to be used to limit the scope of the present embodiment. Other features of the present embodiment will become easily comprehensible through the description below.

BRIEF DESCRIPTION OF THE DRAWINGS

Through the more detailed description of some embodiments of the present embodiment in the accompanying drawings, objects, features, and advantages of the present embodiment will become more apparent, wherein the same reference generally refers to the same components in the embodiments of the present embodiment.

DETAILED DESCRIPTION

Figure 1:
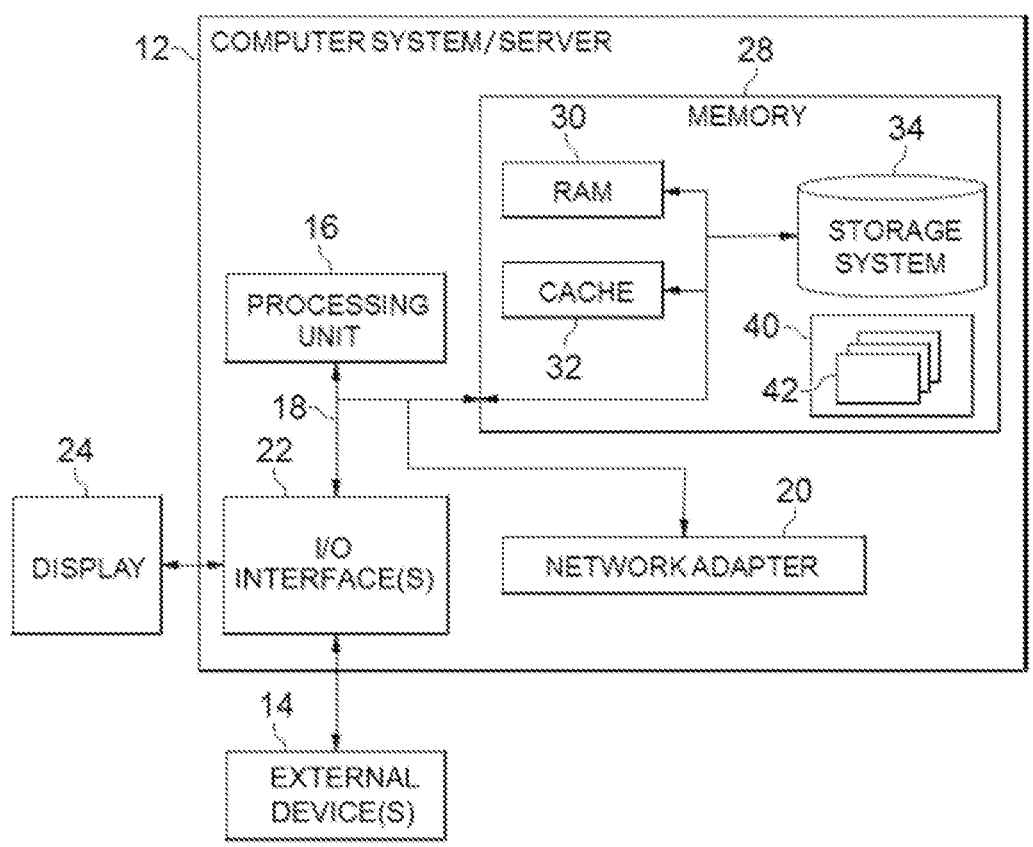
FIG. 1 depicts a cloud computing node, in accordance with an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
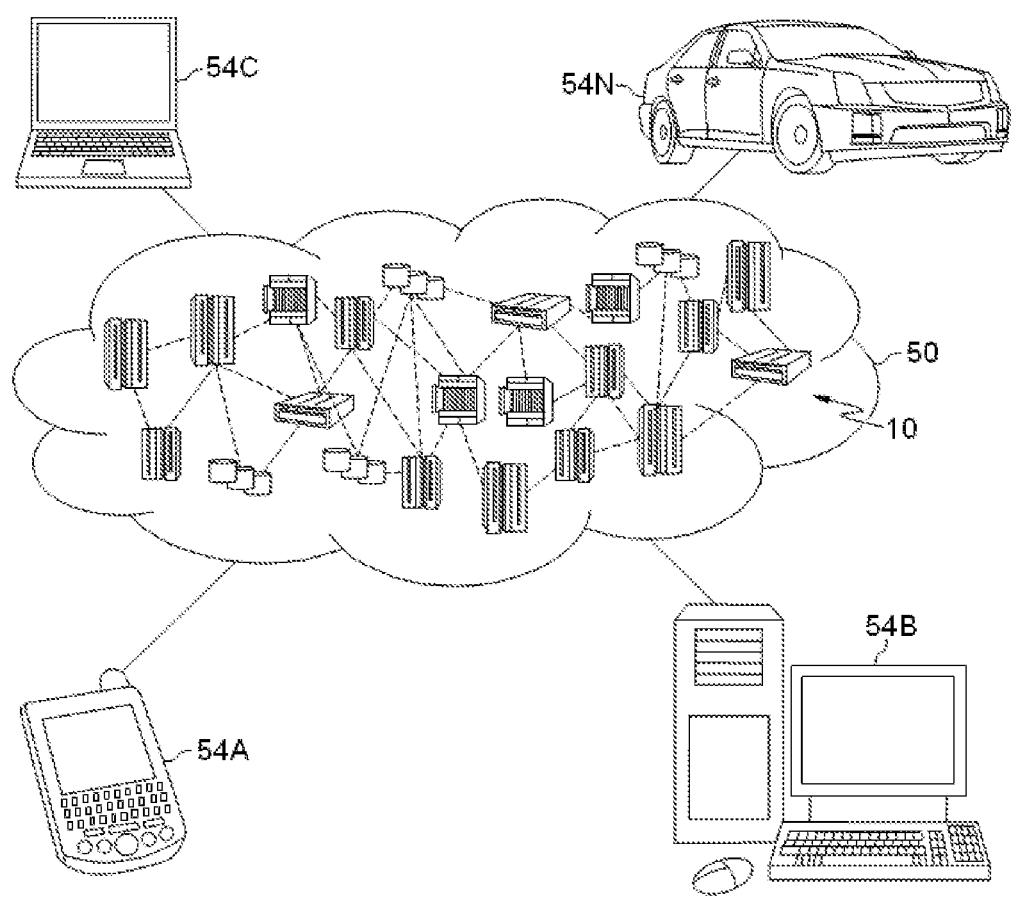
FIG. 2 depicts a cloud computing environment, in accordance with embodiments of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
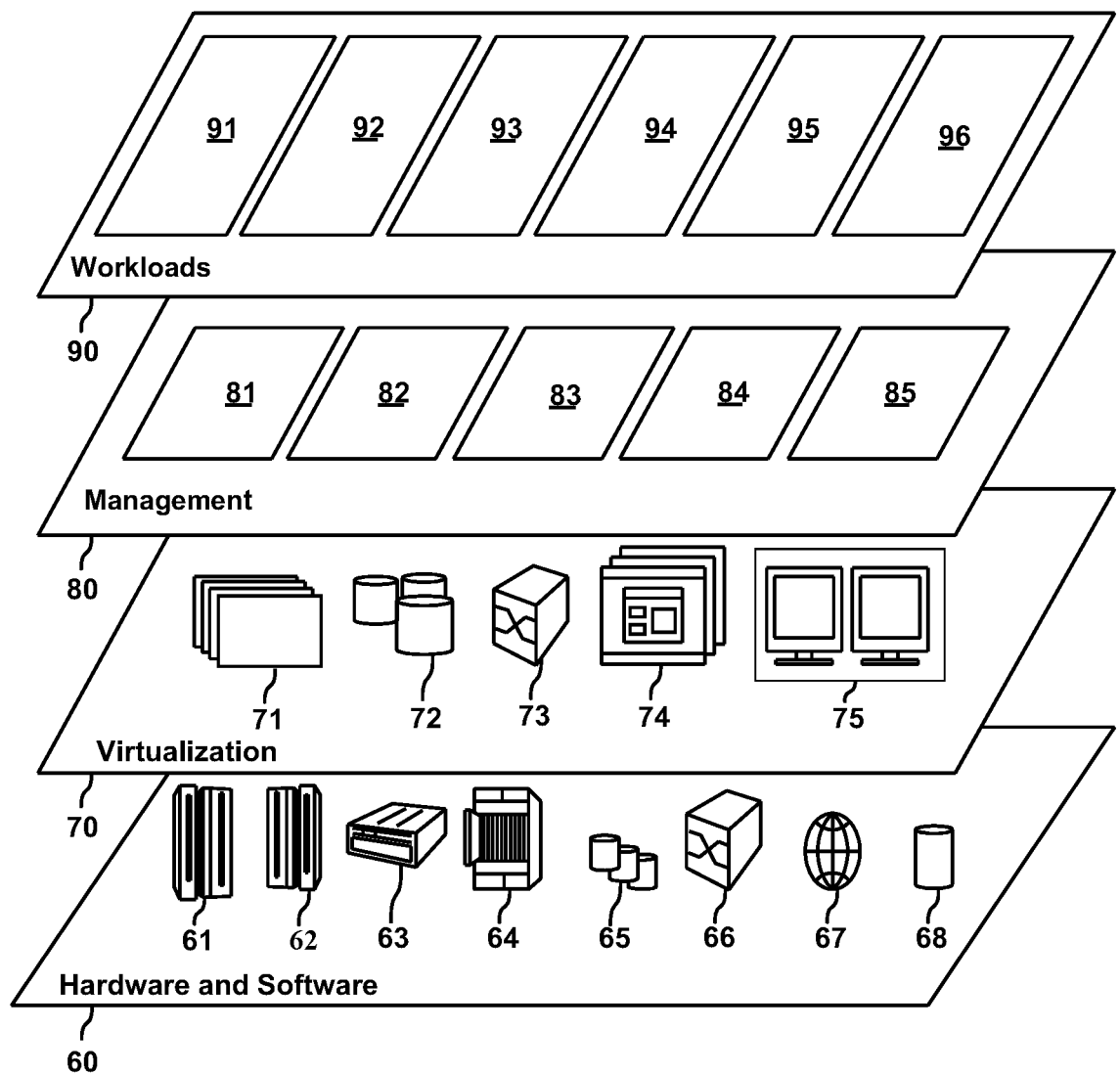
FIG. 3 depicts abstraction model layers, in accordance with embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributed cache processing 96. Hereinafter, reference will be made to FIG. 4 to FIG. 15 to describe details of the distributed cache processing 96.

As described above, some traditional schemes implement a distributed cache system comprising a storage node for storing data persistently and a plurality of client nodes coupled to the storage node. The plurality of client nodes may be used for caching data. However, the aforementioned schemes may have various limitations and/or drawbacks.

For example, some traditional schemes rely on a local read-only cache of each client node to enable caching of data. In these schemes, there is no data sharing between client nodes, and thus a new client node can only get data from the storage node. Some traditional schemes organize the plurality of client nodes into a cache cluster and enable communication between the cache cluster and the storage node, via a gateway node. However, there is usually no distance consideration for data sharing among nodes within the cache cluster. Therefore, nearby data access cannot be achieved. Additionally, some traditional schemes enable data sharing over a peer-to-peer network. However, data consistency among peer nodes and data updating are usually not taken into account in these schemes.

In order to at least partially solve the above and other potential problems, embodiments of the present invention provide a new solution for file management in a distributed file cache system. According to embodiments of the present disclosure, in response to a file of a first version stored at a storage node being obtained by at least one client node, contact information indicating that the file of the first version is accessible from the storage node and the at least one client node is generated and recorded into a distributed hash table. By exploiting the distributed hash table to store the contact information, nearby file access can be achieved. According to embodiments of the present disclosure, version information indicating that the file is of the first version is generated and recorded into a blockchain associated with the plurality of nodes. Since the blockchain prevents from tampering with the stored data, file consistency can be ensured during file update. In addition, embodiments of the present disclosure also provide a solution for managing file slicing and slice versions. As such, unchanged slices can be reused among different versions of the file, thereby implementing fine-grained data sharing among different nodes in the distributed system.

Figure 4:
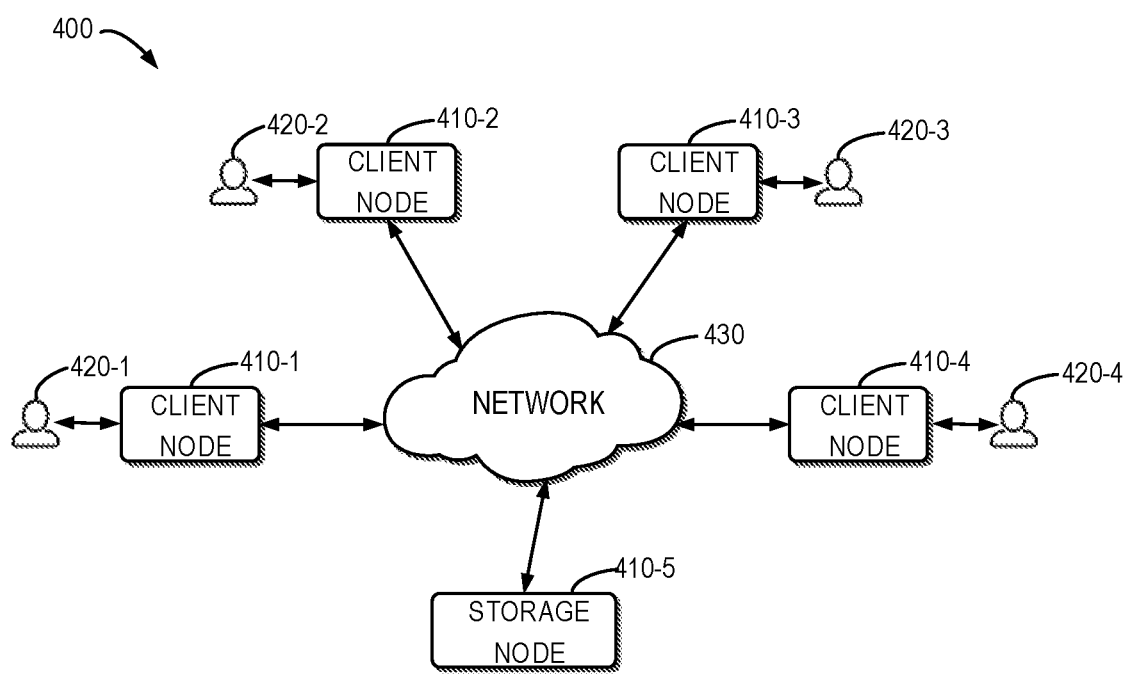
FIG. 4 depicts an example data processing environment in which embodiments of the present invention can be implemented, in accordance with embodiments of the present invention.

With reference now to FIG. 4, an environment 400 in which embodiments of the present disclosure can be implemented is shown. It is to be understood that the structure and functionality of the environment 400 are described only for the purpose of illustration without suggesting any limitations as to the scope of the present disclosure. The embodiments of the present disclosure can be embodied with a different structure and/or functionality.

In FIG. 4, the environment 400 is shown to include a plurality of nodes 410-1, 410-2, 410-3, 410-4, and 410-5 (collectively referred to as "nodes" or individually referred to as a "node" within environment 400). The number of nodes in FIG. 4 is merely for the purpose of illustration, without suggesting any limitation to the number of nodes in the environment 400. In some embodiments, a node within environment 400 may be implemented by a physical device or a virtual machine. For example, a node within environment 400 may be implemented by computer system/server 12 as discussed with reference to FIG. 1. The plurality of nodes within environment 400 may be interconnected with each other by any suitable wired and/or wireless mechanism, for example, via a network 430 such as Internet.

The environment 400 may be a distributed file cache system. As shown, the node 410-5 may act as a storage node for storing files persistently. The nodes 410-1, 410-2, 410-3, and 410-4 may act as client nodes which read and/or write files stored at the storage node 410-5 in response to requests from respective users 420-1, 420-2, 420-3, and 420-4. In the distributed file cache system of environment 400, files may be cached and shared among the client nodes 410-1, 410-2, 410-3, and 410-4. In particular, if a file stored at the storage node 410-5 is accessed by a plurality of client nodes, the storage node 410-5 may identify the file as a hot file and cache the file at the plurality of client nodes which have actual contents of the file. For example, if the user 420-3 wants to read a file which has been cached by the client node 410-2 near the client node 410-3, the client node 410-3 may read the file from the client node 410-2, instead of from the storage node 440. In this way, embodiments of the present invention provide fast file retrieval.

In some embodiments, in order to implement distributed file caching, the plurality of nodes within environment 400 may be organized into a distributed hash table (DHT) network, such as Coral DHT, Kademlia DHT, etc. A DHT is a class of a decentralized distributed system that provides a lookup service similar to a hash table: (key, value) pairs are stored in a DHT, and any participating node can efficiently retrieve the value associated with a given key. In the following, Coral DHT will be taken as an example of the DHT network into which the plurality of nodes 410 are organized. It is to be understood that this is merely for the purpose of illustration, without suggesting any limitations as to the scope of the present disclosure. Embodiments of the present disclosure are also applicable to other distributed networks.

In Coral DHT, a key may be the hash of Uniformed Resource Locator (URL) of a file, which may be 160 bits, for example. Each participating node in Coral DHT may be assigned with an identifier (ID). The ID of a node may be the hash of an IP address of the node, which may be also 160 bits, for example. As such, the key and the node IDs are uniformly distributed in the same 160-bit ID space. In Coral DHT, the value associated with a key may be a list of addresses of nodes which have actual contents of the file indicated by the key. Generally speaking, Coral DHT provides two operations: a "put" operation and a "get" operation. For example, when a file is cached by a node within environment 400, the node may perform a "put" operation to record contact information about the file into Coral DHT. The contact information may indicate that the file is accessible from the node 410. When another node 410 wants to access a file in response to a request from the user, the other node 410 may perform a "get" operation to search the Coral DHT for the contact information about the file, so as to obtain a list of addresses of nodes which have actual contents of the file to be accessed.

In Coral DHT, nodes may be organized into different levels of clusters according to round-trip time (RTT) between two nodes in each level of cluster. For example, in some embodiments, three levels of clusters can be implemented in Coral DHT, in which the lowest-level cluster (also referred to as "Level-2 cluster") may be a regional-wide cluster within which the RTT between any two nodes is below 30 milliseconds, a higher-level cluster (also referred to as "Level-1 cluster") may be a continental-wide cluster within which the RTT between any two nodes is below 100 milliseconds, and the highest-level cluster (also referred to as "Level-0 cluster") may be a global-wide cluster with unlimited RTT thresholds. When a node within environment 400 initiates a "get" operation to search for file contact information about a file, the search may start from the Level-2 cluster. If the file contact information cannot be found in the Level-2 cluster, the search will be then performed in the Level-1 cluster, followed by the Level-0 cluster. It can be seen that Coral DHT creates self-organizing clusters of nodes that fetch information from each other to avoid communicating with more distant or heavily-loaded nodes.

In some embodiments, in order to enable file updating in the distributed file cache system of environment 400, a blockchain associated with the plurality of nodes within environment 400 may be leveraged to manage versions of a file. For example, when a new file is cached by a client node, version information about the file may be recorded in a newly generated block of the blockchain. The version information may indicate the URL of the file as well as the version of the file. The URL of the file may be used to generate a key in the DHT. When the file is updated, new version information about the file indicating the URL of the file as well as the new version of the file may be recorded in another newly generated block of the blockchain. Since the blockchain prevents from tampering with the stored data, file consistency can be ensured during file update.

In some embodiments, in order to implement fine-grained data sharing among the plurality of nodes within environment 400, a file cached by a client node may be divided into a plurality of slices, and slice information about the plurality of slices may be generated and stored at the client node which caches the file. In an example embodiment, for each of the plurality of slices in a file, the slice information may record at least the following: a version of the slice, a start position and an end position of the slice in the file. In some embodiments, for example, the slice information may be recorded in an example data structure as illustrated in Table 1 as below:

TABLE 1

| Slice Information | | | |
|---|---|---|---|
| Slice No. | Version | Start Position | End Position |
| 1 | 0 | 0 | 1000 |
| 2 | 0 | 1001 | 2000 |
| 3 | 0 | 2001 | 3000 |

Additionally, in some embodiments, for each of the plurality of slices in a file, the slice information may also record one or more checksums for ensuring data integrity and accuracy during data transmissions. For example, a slice may include a plurality of binaries. A checksum for the slice can be determined by summing the plurality of binaries. In some embodiments, for example, the slice information including one or more checksums may be recorded in an example data structure as illustrated in Table 2 as below:

TABLE 2

| Slice Information | | | | | |
|---|---|---|---|---|---|
| Slice No. | Version | Start Position | End Position | Weak Checksum | Strong Checksum |
| 1 | 0 | 0 | 1000 | 8A74E65A | 8A74E65A4085F1F57E5AF210 53E29070 |
| 2 | 0 | 1001 | 2000 | F06AFC5D | F06AFC5D6E6C633827B5F646 89277A4B |
| 3 | 0 | 2001 | 3000 | D926D7BB | D926D7BB9CCF46FC04A61B D65D87B9B3 |

In Table 2, for example, the strong checksum may be determined as a sum of the plurality of binaries included in a slice, while the weak checksum may be determined as the highest predetermined number of bits in the strong checksum, so as to enable quick verification of data integrity.

In some embodiments, when updating the file cached by the client node, some slices may be reused among different versions of the file. That is, only a part of the plurality of slices may need to be updated. In this way, file updating can be implemented in a flexible and cost-effective manner. The slice information for the file can be updated accordingly. As such, data sharing among the plurality of nodes within environment 400 can be performed based on slices of a file, instead of based on an entire file.

Figure 5A:
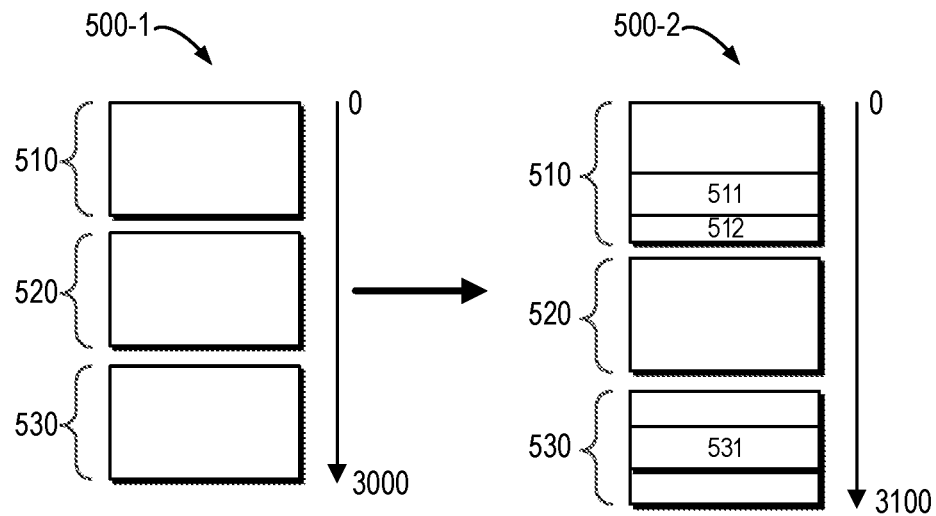
FIG. 5A depicts an example diagram for updating a file, in accordance with embodiments of the present invention.
Figure 5B:
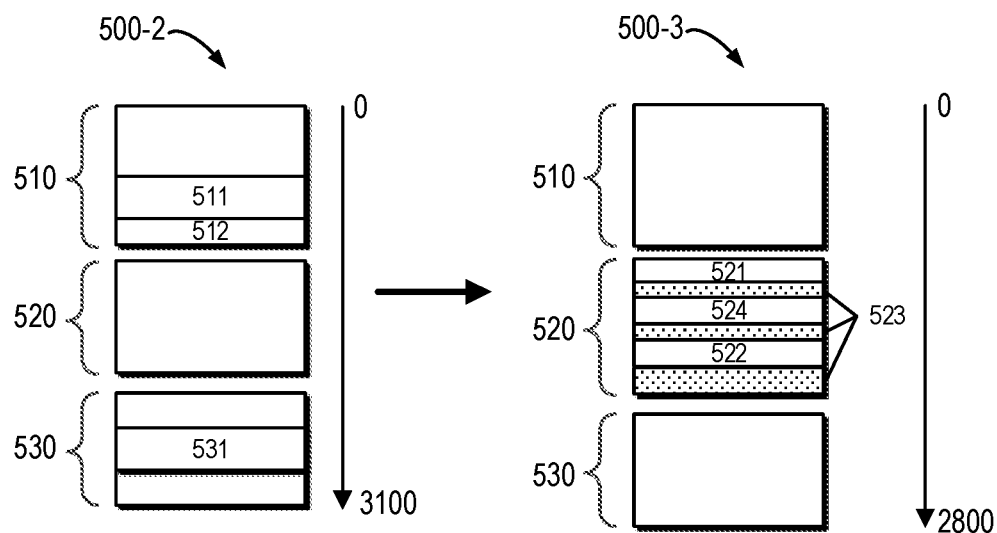
FIG. 5B depicts an example diagram for updating a file, in accordance with embodiments of the present invention.
Figure 5C:
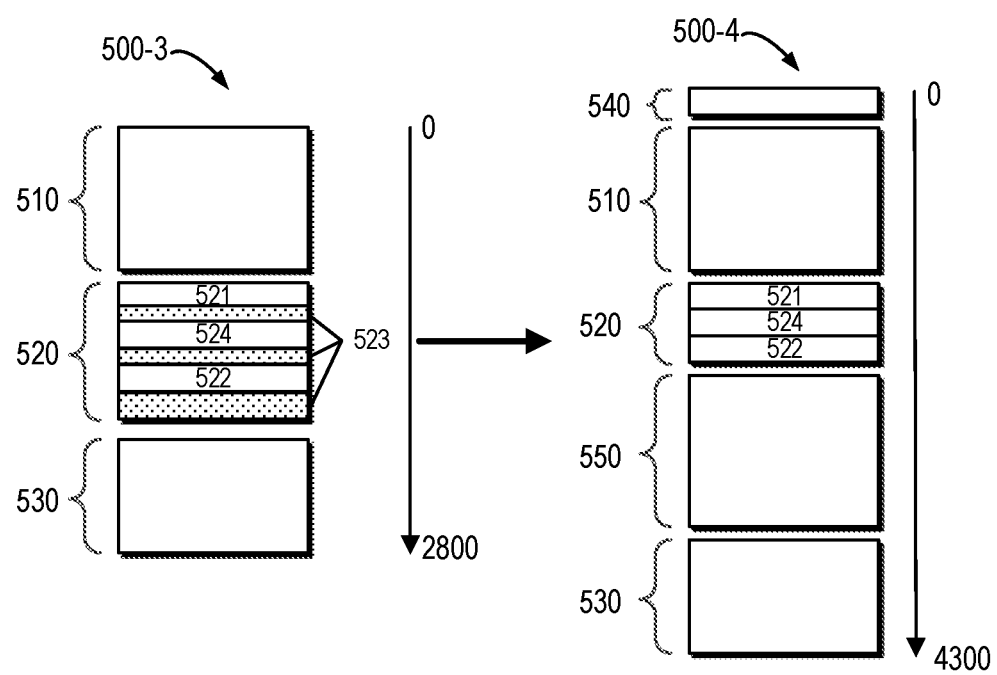
FIG. 5C depicts an example diagram for updating a file, in accordance with embodiments of the present invention.

FIGS. 5A-5C depict example diagrams for updating a file in accordance with some embodiments of the present disclosure.

FIG. 5A depict a file of version 1, which is denoted as file 500-1. For example, the file 500-1 includes three slices 510, 520 and 530. In this example, the version of each of the three slices is 1. For example, the slice information for the file 500-1 is shown in Table 3 as below:

TABLE 3

| Slice Information for the file 500-1 | | | | | |
|---|---|---|---|---|---|
| Slice No. | Version | Start Position | End Position | Weak Checksum | Strong Checksum |
| 510 | 1 | 0 | 1000 | 8A74E65A | 8A74E65A4085F1F57E5AF210 53E29070 |

TABLE 3-continued

Slice Information for the file 500-1

| Slice No. | Version | Start Position | End Position | Weak Checksum | Strong Checksum |
|---|---|---|---|---|---|
| 520 | 1 | 1001 | 2000 | F06AFC5D | F06AFC5D6E6C633827B5F64689277A4B |
| 530 | 1 | 2001 | 3000 | D926D7BB | D926D7BB9CCF46FC04A61BD65D87B9B3 |

FIG. 5A also depicts a file of version 2 (denoted as file 500-2) into which the file 500-1 is modified. In an example embodiment, compared with the file 500-1, a part 511 in the slice 510 and a part 531 in the slice 530 are modified, while another part 512 is added into the slice 510. For example, the slice information for the file 500-2 is shown in Table 4 as below:

TABLE 4

Slice Information for the file 500-2

| Slice No. | Version | Start Position | End Position | Weak Checksum | Strong Checksum |
|---|---|---|---|---|---|
| 510 | 2 | 0 | 1100 | C16024C6 | C16024C65856B196A93490386154F98D |
| 520 | 1 | 1101 | 2100 | F06AFC5D | F06AFC5D6E6C633827B5F64689277A4B |
| 530 | 2 | 2101 | 3100 | A6B14A31 | A6B14A3123D327627A887A6A442D427F |

Compared with Table 3, the version, the end position and the checksums of the slice 510 are changed in Table 4, since the contents in the slice 510 as well as the size of the slice 510 have been changed. The version and the checksums of the slice 520 remain unchanged in Table 4, since the contents in the slice 520 remain unchanged. However, since the end position of the slice 510 is changed, the start position and the end position of the slice 520 are changed in Table 4. Likewise, the version, the start and end positions as well as the checksums of the slice 530 are changed in Table 4. Specifically, in Table 4, the versions of the slices 510 and 530 may be updated with the latest version of the file (i.e., version 2).

FIG. 5B depicts a file of version 3 (denoted as file 500-3) into which the file 500-2 is modified. In an example embodiment, compared with the file 500-2, a part 521 is added into the slice 520, a part 522 in the slice 520 is modified, a part 523 is deleted from the slice 520 and a part 524 in the slice 520 remains unchanged. For example, the slice information for the file 500-3 is shown in Table 5 as below:

Compared with Table 4, the information about the slice 510 remains unchanged in Table 5, since the contents in the slice 510 remain unchanged. The version, the end position and the checksums of the slice 520 are changed in Table 5, since the contents in the slice 520 as well as the size of the slice 520 have been changed. Since the end position of the slice 520 is changed, the start and end positions of the slice 530 are changed in Table 5. However, the version and the checksums of the slice 530 remain unchanged in Table 5, since the contents of the slice 530 remain unchanged. Specifically, in Table 5, the version of the slice 520 may be updated with the latest version of the file (i.e., version 3).

FIG. 5C depicts a file of version 4 (denoted as file 500-4) into which the file 500-3 is modified. In an example embodiment, compared with the file 500-3, a new slice 540 is added in front of the slice 510, and a new slice 550 is inserted between the slices 520 and 530. The slices 510, 520 and 530 remain unchanged. For example, the slice information for the file 500-4 is shown in Table 6 as below:

TABLE 5

Slice Information for the file 500-3

| Slice No. | Version | Start Position | End Position | Weak Checksum | Strong Checksum |
|---|---|---|---|---|---|
| 510 | 2 | 0 | 1100 | C16024C6 | C16024C65856B196A93490386154F98D |
| 520 | 3 | 1101 | 1800 | B0DB73FC | B0DB73FC81EAC0A110D3B40C41FC43A5 |
| 530 | 2 | 1801 | 2800 | A6B14A31 | A6B14A3123D327627A887A6A442D427F |

TABLE 6

Slice Information for the file 500-4

| Slice No. | Version | Start Position | End Position | Weak Checksum | Strong Checksum |
|---|---|---|---|---|---|
| 510 | 2 | 201 | 1300 | C16024C6 | C16024C65856B196A93490386154F98D |
| 520 | 3 | 1301 | 2000 | B0DB73FC | B0DB73FC81EAC0A110D3B40C41FC43A5 |
| 530 | 2 | 3301 | 4300 | A6B14A31 | A6B14A3123D327627A887A6A442D427F |
| 540 | 4 | 0 | 200 | F95ADBCE | F95 ADBCE0A51589CB 6E87112EB6BECD4 |
| 550 | 4 | 2001 | 3300 | EC443E36 | EC443E361BE4CEE5BDA5A026B1335BE8 |

Compared with Table 5, the start and end positions of the slices 510, 520 and 530 are changed in table 6, while other information about the slices 510, 520 and 530 remains unchanged. Slice information about the new slices 540 and 550 is generated and recorded in Table 5. Specifically, the versions of the slices 540 and 550 may reuse the latest version of the file (i.e., version 4).

In this way, fine-grained file sharing and file updating can be achieved by file slicing as described with reference to FIGS. 5A-5C. In the following, more details about file caching, file access and file slicing in the distributed file cache system of environment 400 will be described in detail with reference to FIGS. 6-12.

As described above, in order to enable distributed file caching and file updating among the plurality of nodes in the environment 400, both a DHT and a blockchain associated with the plurality of nodes may be established. For example, the storage node 410-5 in the environment 400 may be responsible for initializing both the DHT and the blockchain. Each of the client nodes 410-1, 410-2, 410-3, and 410-4 may perform corresponding operations to join both the DHT and the blockchain, so as to join the distributed file cache system of environment 400.

Figure 6:
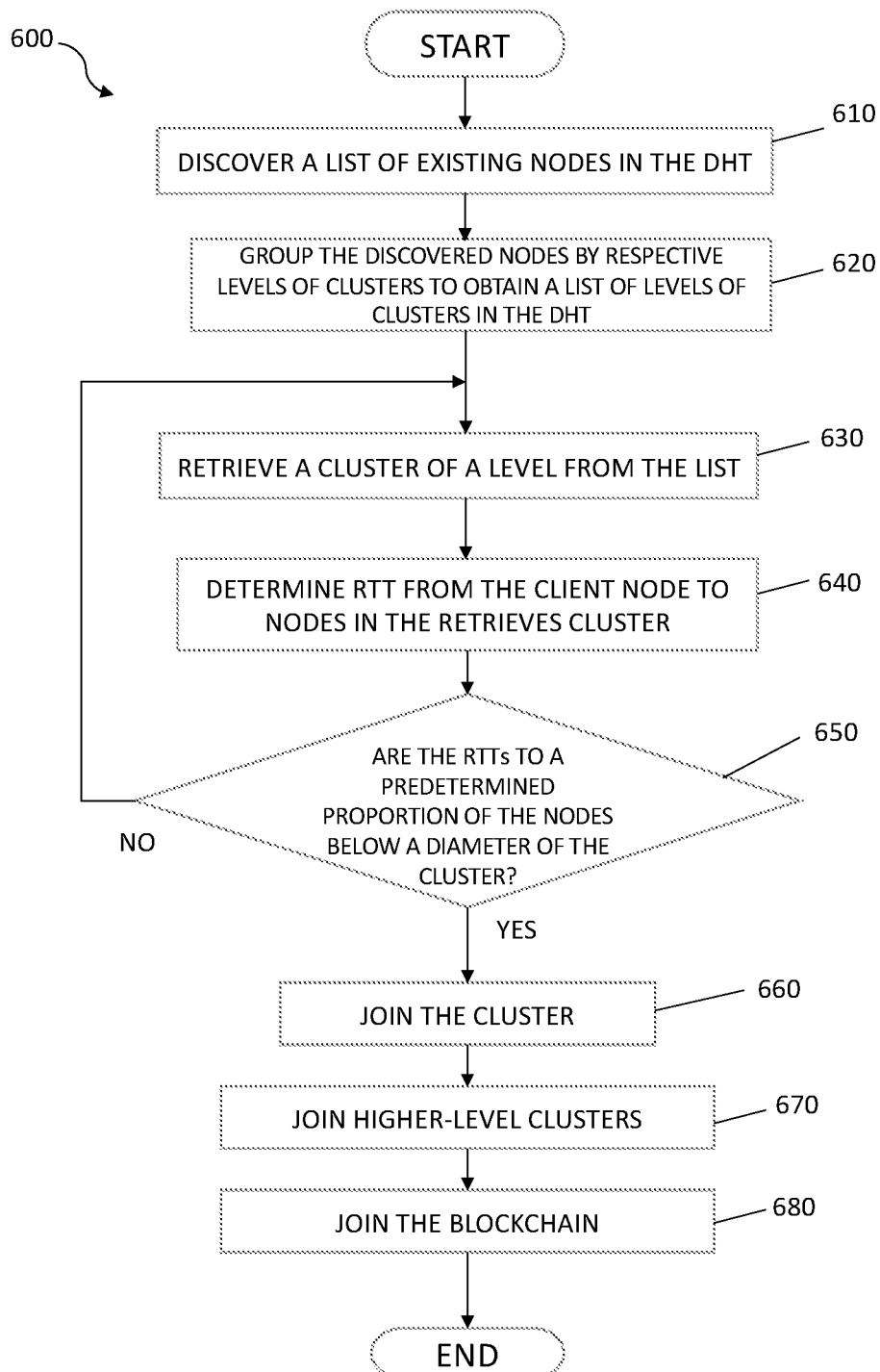
FIG. 6 depicts a flowchart of an example method for joining a distributed file cache system, in accordance with embodiments of the present invention.

FIG. 6 depicts a flowchart of a method 600 for joining the distributed file cache system 400 in accordance with embodiments of the present disclosure. For example, the method 600 may be performed by a client node which wants to join the distributed file cache system of environment 400, such as, the client node 410-1, 410-2, 410-3 or 410-4, in the environment 400. It is to be understood that the method 600 may also comprise additional blocks (not shown) and/or may omit the illustrated blocks. The scope of the present disclosure described herein is not limited in this aspect.

At block 610, in response to initialization of the client node and assignment of the client node with a local ID by a user, the client node may discover a list of existing nodes in the DHT. Several mechanisms may be used to discover the existing nodes, including but not limited to using IP multicasts, using some seed nodes, etc.

At block 620, the client node may group the discovered nodes by respective levels of clusters, so as to obtain a list of levels of clusters in the DHT. For example, in Coral DHT, the discovered nodes may be grouped into three levels of clusters: Level-2 cluster, Level-1 cluster, and Level-0 cluster. The Level-2 cluster is the lowest-level cluster, which is a regional-wide cluster with a 30-millisecond threshold. The Level-1 cluster is a higher-level cluster, which is a continental-wide cluster with a 100-millisecond threshold. The Level-0 cluster is the highest-level cluster, which is a global-wide cluster with unlimited RTT thresholds.

At block 630, the client node may retrieve a cluster of a level from the list. For example, the client node can start with retrieving the lowest-level cluster with the lowest RTT threshold (such as, the Level-2 cluster in Coral DHT).

At block 640, the client node may determine RTTs from the client node to the nodes in the retrieved cluster. Then, at decision block 650, the client node may compare the determined RTTs with the RTT threshold of the cluster (also referred to as "a diameter of the cluster"). For example, in Level-2 cluster in Coral DHT, the client nodes may compare the determined RTTs with 30 milliseconds.

If the RTTs to a predetermined proportion (for example, 90%) of the nodes in the cluster are below the diameter of the cluster, at block 660, the client node may join the cluster. Otherwise, the method 600 proceeds to block 630, where the client node may retrieve from the list a next lowest-level cluster (such as, the Level-1 cluster in Coral DHT).

At block 670, upon join of the cluster, the client node may insert itself into higher-level clusters. For example, if the client node joins the Level-2 cluster in Coral DHT at block 660, it may also join the Level-1 and Level-0 clusters at block 670.

At block 680, the client node may join the blockchain. For example, the client node may exploit any mechanism currently known or to be developed in the future to join the blockchain, which will not be further described in detail herein.

In this way, a new client node can join the distributed file cache system of environment 400 by joining both the DHT and blockchain.

Figure 7:
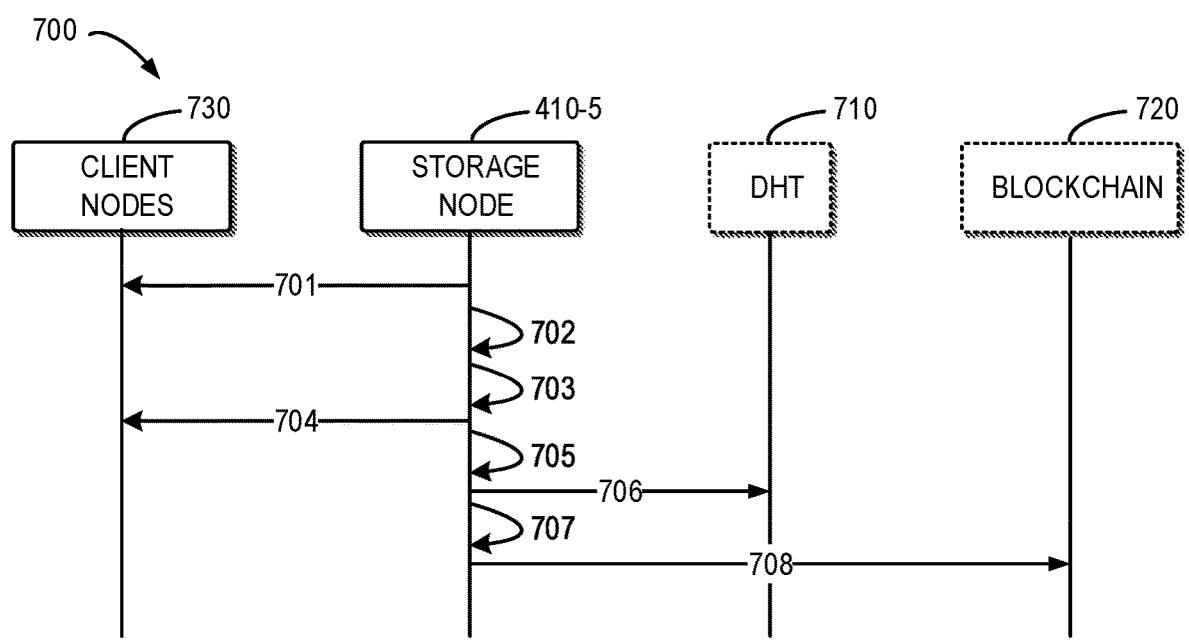
FIG. 7 depicts an example diagram for caching a file in the distributed file cache system, in accordance with embodiments of the present invention.

With reference now to FIG. 7, an example diagram for caching a file in the distributed file cache system 400 in accordance with embodiments of the present disclosure is shown. In FIG. 7, a DHT 710 and a blockchain 720 associated with the plurality of nodes 410-1, 410-2, through 410-5 are shown. FIG. 7 also shows a set of client nodes 730, which may include one or more of the plurality of client nodes 410-1, 410-2, 410-3, and 410-4 in the environment 400.

As shown in FIG. 7, the set of client nodes 730 (such as, more than one client nodes) may obtain 701 a same file from the storage node 410-5. For example, the file stored at the storage node 410-5 may be of a first version. In response to the file of the first version being obtained by the client nodes 730, the storage node 410-5 may identify the file of the first version as a hot file to be cached.

In some embodiments, in response to determining that the file of the first version stored at the storage node 410-5 is to be cached, the storage node 410-5 may divide 702 the file of the first version into a plurality of slices. In addition, the storage node 410-5 may generate 703 slice information based on the plurality of slices. For example, with respect to each of the plurality of slices, the slice information may indicate at least one of the following: a version of the slice corresponding to the first version, start and end positions of the slice in the file of the first version. The storage node 410-5 may record 703 the slice information by itself and record 704 the slice information at the client nodes 730.

In some embodiments, in response to determining that the file of the first version stored at the storage node 410-5 is to be cached, the storage node 410-5 may generate 705 contact information for the file of the first version. For example, the generated contact information may indicate that the file of the first version is accessible from the client nodes 730 and the storage node 410-5. The storage node 410-5 may record 706 the contact information into the DHT.

In some embodiments, each node associated with the DHT may have a respective route table for recording nearby nodes. For example, the storage node 410-5 may check a respective route table to determine one or more nearby nodes of the storage node 410-5. Then, the storage node 410-5 may record the contact information at the determined one or more nearby nodes. In some embodiments, if the DHT 710 is Coral DHT, the storage node 410-5 may perform a "put" operation to record the contact information about the file of the first version into Coral DHT. For example, the storage node 410-5 may generate the hash of the URL of the file as a key in Coral DHT and store the contact information as a value associated with the key. In this way, the contact information can be detected by other nodes in the DHT.

In some embodiments, the storage node 410-5 may also generate 707 first version information indicating that the file is of the first version. For example, the first version information may be recorded in a following data structure: {the URL of the file: the version of the file}. The URL of the file will be used to generate a key in the DHT. The storage node 410-5 may record 708 the first version information into the blockchain 720. For example, the first version information may be recorded as a transaction in a newly generated block of the blockchain 720. It is to be understood that the blockchain component 413-5 can exploit any mechanism currently known or to be developed in the future to record a transaction into the blockchain, which will not be further described in detail herein. Since the blockchain prevents from tampering with the stored data, file consistency can be ensured.

Figure 8:
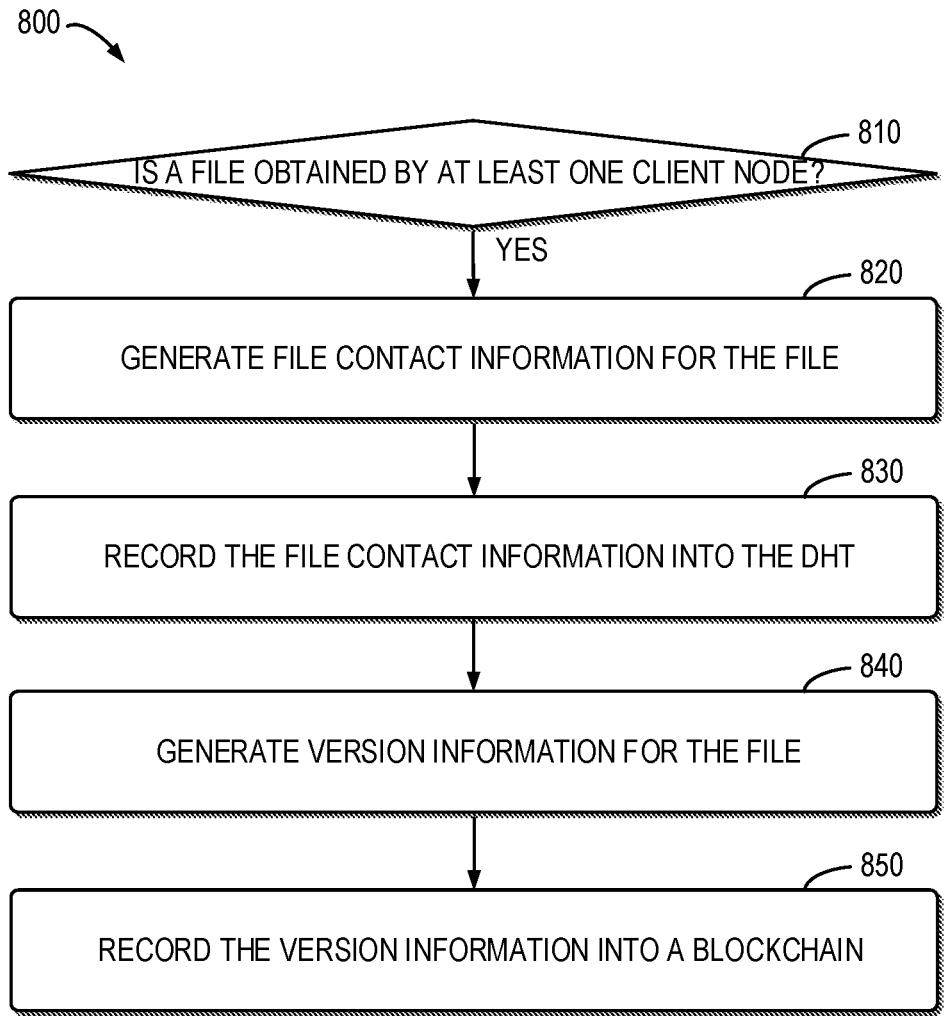
FIG. 8 depicts a flowchart of an example method for caching a file in the distributed file cache system, in accordance with embodiments of the present invention.

FIG. 8 depicts a flowchart of a method 800 for caching a file in the distributed file cache system in accordance with embodiments of the present disclosure. For example, the method 800 may be performed at the storage node 410-5. The method 800 will be described in connection with FIG. 7. It is to be understood that the method 800 may also comprise additional blocks (not shown) and/or may omit the illustrated blocks. The scope of the present disclosure described herein is not limited in this aspect.

At block 810, the storage node 410-5 determines if a file of a first version stored at the storage node 410-5 is obtained by at least one client node. The storage node 410-5 and the plurality of client nodes 410-1, 410-2, 410-3, and 410-4 are associated with a DHT 710.

In response to a set of client nodes 730 obtaining the file of the first version stored at the storage node 410-5, at block 820, the storage node 410-5 generates contact information indicating that the file of the first version is accessible from the storage node 410-5 and the set of client nodes 730.

At block 830, the storage node 410-5 records the contact information into the DHT 710. In some embodiments, the storage node 410-5 may determine a node from the plurality of nodes 410, such that a distance from the node to the storage node 410-5 is below a threshold distance. Then, the storage node 410-5 may record the contact information into the DHT 710 at the determined node.

At block 840, the storage node 410-5 generates first version information indicating that the file is of the first version. Then, at block 850, the storage node 410-5 records the first version information into a blockchain 720 associated with the plurality of nodes 410.

In some embodiments, the storage node 410-5 may further divide the file of the first version into a plurality of slices, generate slice information about the plurality of slices, and record the slice information at the storage node 410-5 and the set of client nodes 730. In some embodiments, the slice information may indicate at least one of the following: respective versions of the plurality of slices corresponding to the first version; respective start positions of the plurality of slices in the file of the first version; and respective end positions of the plurality of slices in the file of the first version.

Figure 9:
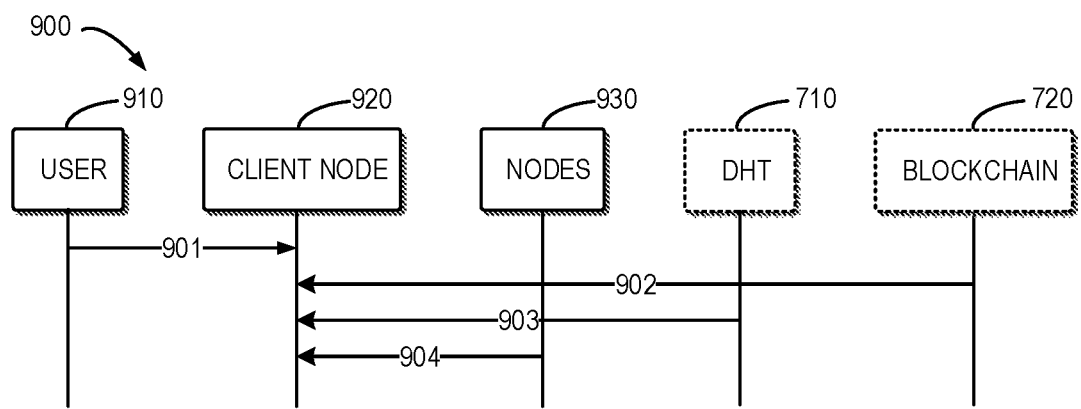
FIG. 9 depicts an example diagram for accessing a file cached in the distributed file cache system, in accordance with embodiments of the present invention.

With reference now to FIG. 9, an example diagram of a process 900 for accessing a file cached in the distributed file cache system 400 in accordance with embodiments of the present disclosure is shown. In FIG. 9, the DHT 710 and the blockchain 720 associated with the plurality of nodes 410-1, 410-2, through 410-5 are shown. FIG. 9 also depicts a user 910 and a client node 920 associated with the user 910. The user 910 can be one of the users 420-1, 420-2, 420-3, or 420-4, and the client node 920 can be one of the client nodes 410-1, 410-2, 410-3, or 410-4 which corresponds to the user 910.

As depicted in FIG. 9, the client node 920 may receive 901 a request from the user 910 to access a file. For example, the user 910 may intend to read a file or update a file. In response to receiving the request from the user 910, the client node 920 may obtain 902 version information about the file from the blockchain 720. In some embodiments, the obtained version information (also referred to as "first version information") may indicate the URL of the file as well as the version of the file. For example, the first version information may indicate that the file is of a first version.

In response to the first version information being obtained, the client node 920 may determine, from the plurality of nodes 410, a set of nodes from which the file of the first version is accessible. In some embodiments, the client node 920 may search 903 the DHT 710 for contact information about the file of the first version. For example, the client node 920 may generate the hash of the URL of the file indicated by the first version information and use the generated hash as a key for searching the DHT 710. In some embodiments, if the DHT 710 is Coral DHT, the client node 920 may initiate a "get" operation to search the DHT for the contact information.

Figure 10:
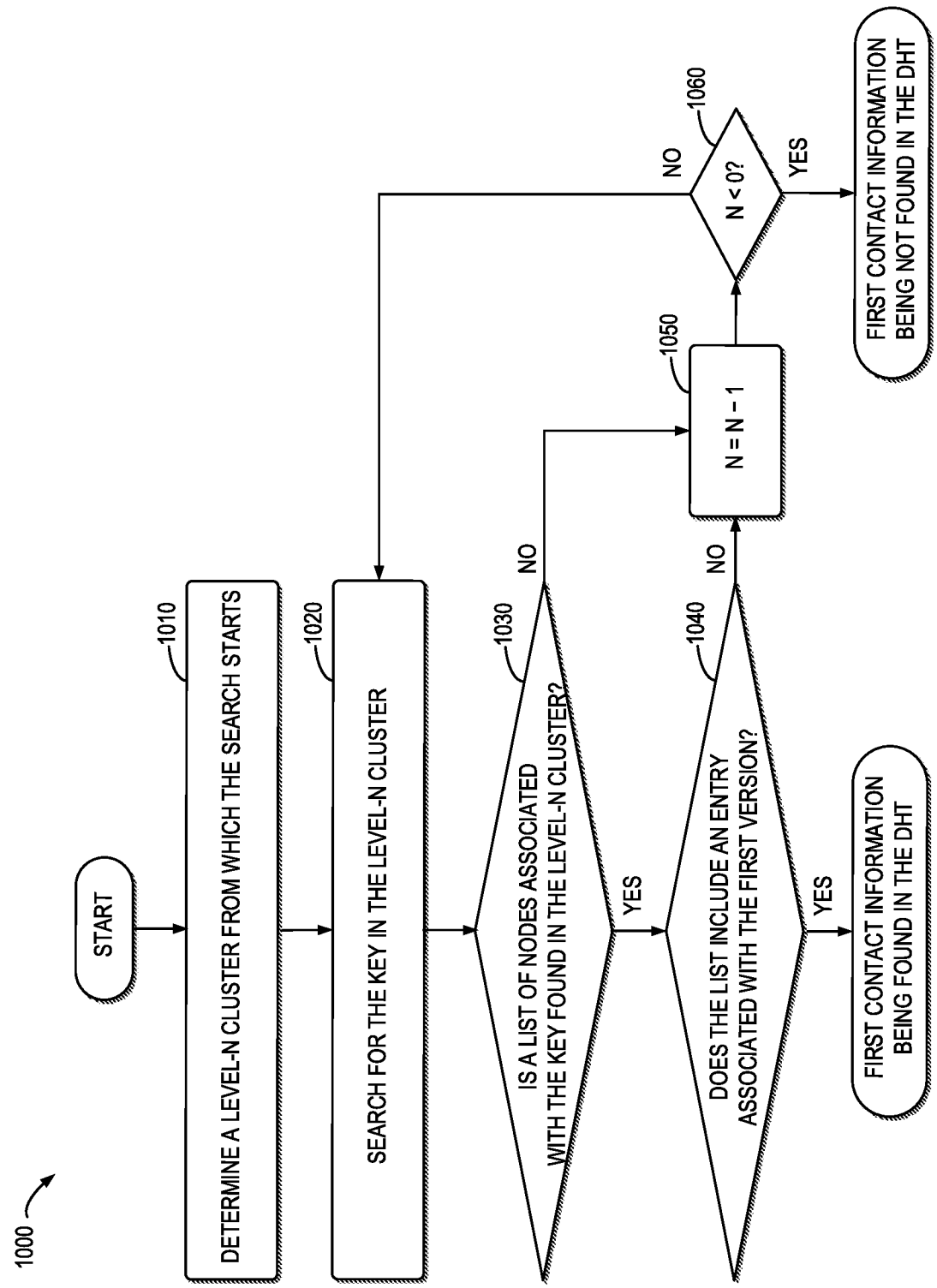
FIG. 10 depicts a flowchart of an example method of searching for file contact information in the distributed hash table, in accordance with embodiments of the present invention.

FIG. 10 depicts a flowchart of a method 1000 of searching for file contact information in the DHT in accordance with embodiments of the present disclosure. For example, the method 1000 may be performed by a client node which wants to search for file contact information in the DHT, such as, the client node 920 as shown in FIG. 9. It is to be understood that the method 1000 may also comprise additional blocks (not shown) and/or may omit the illustrated blocks. The scope of the present disclosure described herein is not limited in this aspect.

In FIG. 10, the method may initiate in response to the client node 920 initiating a "get" operation to search the DHT for file contact information. At block 1010, the client node 920 may determine a Level-N cluster from which the search starts. For example, in Coral DHT (which includes three levels of clusters), the value of N may be initialized to be 2. That is, the search may start from the lowest-level cluster with the lowest RTT threshold in the DHT.

At block 1020, the client node 920 may search the Level-N cluster for the key generated from the URL of the file. For example, in Coral DHT, the client node 920 may perform an operation referred to as "find_closer_node (key)" to find some node storing a value (that is, a list of nodes) under "key."

At block 1030, the client node 920 may determine if the list of nodes (i.e., the value associated with the key) is found in the Level-N cluster. If the client node 920 determines that the list of nodes associated with the key is found in the Level-N cluster, at block 1040, the client node 920 may further check if the found list of nodes includes an entry associated with the first version. If so, the contact information about the file is found, which indicates a list of nodes which have actual contents of the file indicated by the key.

If the client node 920 determines that the list of nodes associated with the key is absent in the Level-N cluster, or if there is no entry associated with the first version in the found list of nodes, at block 1050, the client node 920 may decrement the value of N by 1. At block 1060, the client node 920 may determine if the value of N is below 0. If the value of N is greater than or equal to 0, the method proceeds to block 1020, where the client node 920 may continue the search on a higher-level cluster (such as, the Level-1 cluster). If the value of N is below 0, it means that the search on all of the levels of the clusters in the DHT has been performed but no file contact information is found. In this event, the client node 920 may determine that the contact information about the file is absent in the DHT.

Referring back to FIG. 9, in some embodiments, if the contact information about the file being found in the DHT 710, the client node 920 may determine, based on the contact information, a set of nodes 930 from which the file of the first version is accessible. Otherwise, the client node 920 may add the storage node 410-5 to the set of nodes 930. That is, if the contact information about the file is absent in the DHT 710, the client node 920 may obtain the file of the first version from the storage node 410-5.

In some embodiments, in response to determining the set of nodes 930 from which the file of the first version is accessible, the client node 920 may obtain 904 the file of the first version from one or more of the set of nodes 930.

In some embodiments, in order to obtain the file of the first version, the client node 920 may obtain slice information about the file from each of the set of nodes 930. Here, it is assumed that the set of nodes 930 include three different nodes: node A, node B and node C. For example, slice information A on the node A, slice information B on the node B and slice information C on the node C are shown in Tables 7-9 as below:

TABLE 7

Slice Information A on the node A

| Slice No. | Version | Start Position | End Position |
|---|---|---|---|
| 1 | 0 | 1 | 1000 |
| 2 | 0 | 1001 | 2000 |
| 3 | 0 | 2001 | 3000 |

TABLE 8

Slice Information B on the node B

| Slice No. | Version | Start Position | End Position |
|---|---|---|---|
| 1 | 0 | 1 | 1000 |
| 2 | 1 | 1001 | 2000 |
| 3 | 0 | 2001 | 3000 |

TABLE 9

Slice Information C on the node C

| Slice No. | Version | Start Position | End Position |
|---|---|---|---|
| 1 | 0 | 1 | 1000 |
| 2 | 2 | 1001 | 2000 |
| 3 | 0 | 2601 | 3600 |
| 4 | 2 | 2001 | 2600 |

The client node 920 may obtain the slice information A, B, and C from the three different nodes A, B, and C, respectively. In some embodiments, in response to the slice information A, B and C being obtained, the client node 920 may determine the latest slice information which contains the latest slice version. For example, if the client node 920 wants to access the file of version 2, the client node 920 may determine that the slice information C indicating slices of the latest version 2 is the latest. The client node 920 may further check if local slice information about the file is present.

In some embodiments, if there is no local slice information about the file to be accessed at the client node 920, the client node 920 may traverse the slice #1 to the slice #4 in the latest slice information C one by one. If a slice has a version which is below 2, it means that the slice can be reused from a historical version of the slice. For example, the slice #1 can be retrieved from any of the nodes A, B and C. However, if a slice has a version which is equal to 2, it means that the slice can only be retrieved from the node having the latest file, such as, the node C.

Alternatively, in some embodiments, if there is local slice information about the file to be accessed at the client node 920, the client node 920 may traverse the slice #1 to the slice #4 in the latest slice information C one by one. If a slice has a version which is equal to the local slice version, no action is required. Otherwise, the slice should be retrieved from the node having the latest file, such as, the node C. For example, the local slice information at the client node 920 is shown in Table 10 as below:

TABLE 10

Local Slice Information on the node 920

| Slice No. | Version | Start Position | End Position |
|---|---|---|---|
| 1 | 0 | 1 | 1000 |
| 2 | 1 | 1001 | 2000 |
| 3 | 0 | 2601 | 3600 |

According to Table 10, for example, the slices #1 and #3 at the client node 920 can be reused. That is, there is no need to retrieve the slices #1 and #3 from other nodes.

In some embodiments, in response to obtaining all of the plurality of slices included in the file of the first version, the client node 920 may sort the plurality of slices based on their start and end positions, so as to get the whole file.

Figure 11:
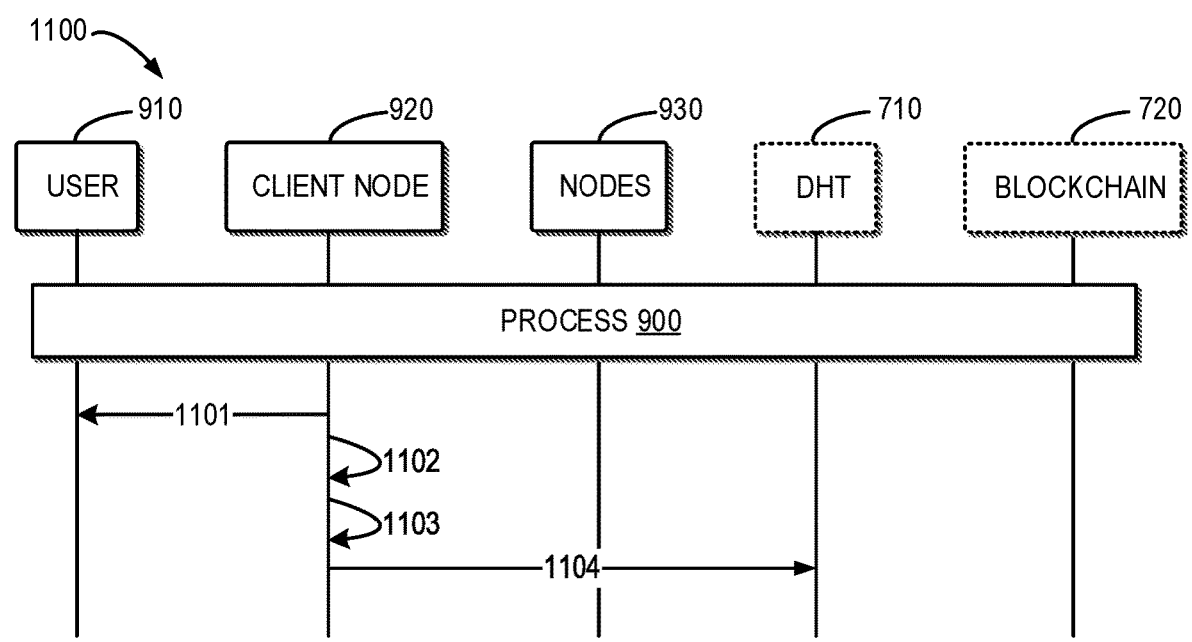
FIG. 11 depicts an example diagram for reading a file cached in the distributed file cache system, in accordance with embodiments of the present invention.

As described above, in FIG. 9, the request received from the user 910 may be intended to read the file or modify the file. If the request is to read the file, some corresponding operations need to be performed by the client node 920. FIG. 11 shows an example diagram of a process 1100 for reading a file cached in the distributed file cache system 400 in accordance with embodiments of the present disclosure.

As depicted in FIG. 11, if the request sent from the user 910 to the client node 920 is intended to read the file, the process 900 may be performed so as to obtain the file of the latest version (such as, the first version).

In response to the file of the first version being obtained, the client node 920 may return 1101 the obtained file of the first version to the user 910. Additionally, in some embodiments, the client node 920 may update 1102 the slice information based on the plurality of slices included in the obtained file of the first version and record the updated slice information at the client node 920. The updating of the slice information has been described with reference to FIGS. 5A-5C, which will not be repeated here.

Additionally, in some embodiments, the client node 920 may generate 1103 contact information indicating that the file of the first version is accessible from the client node 920, and record 1104 the generated contact information into the DHT 710. The recording of the contact information has been described in further detail above with reference to FIG. 7.

Figure 12:
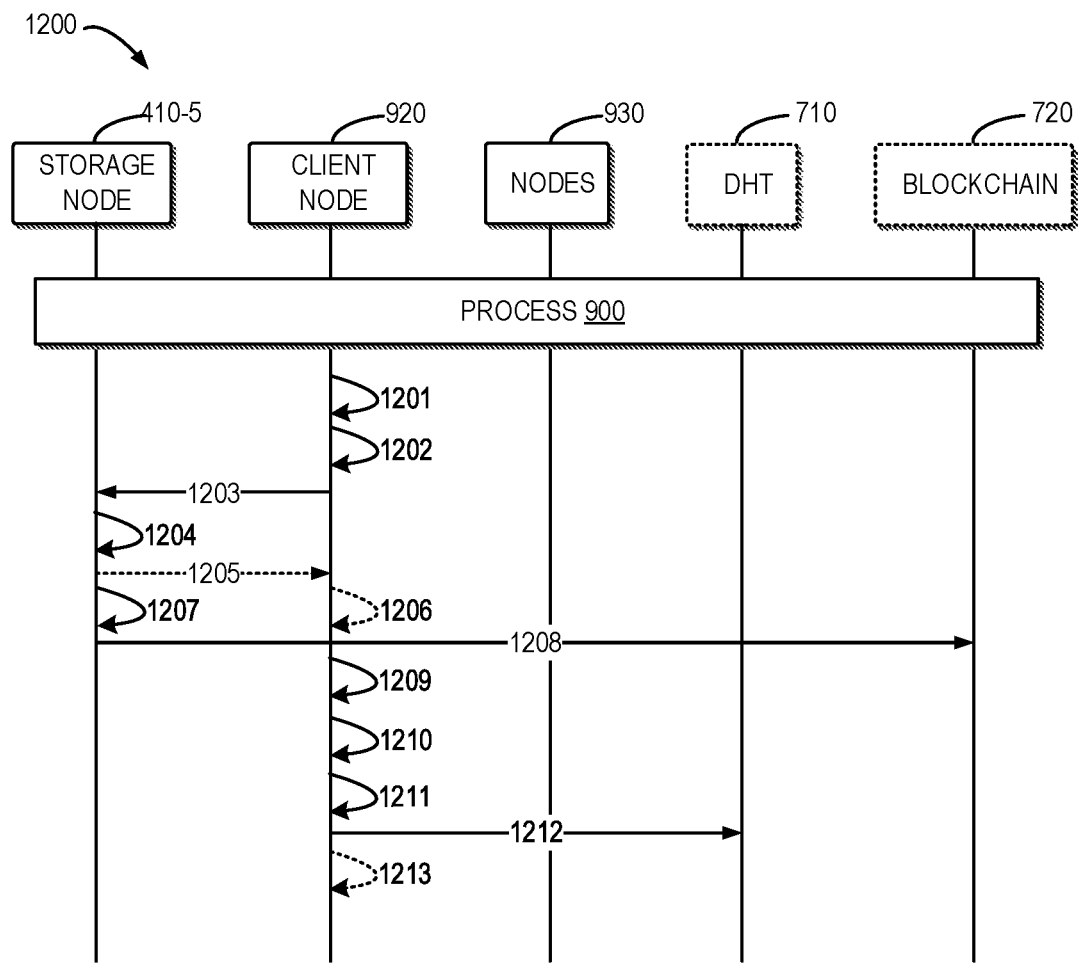
FIG. 12 depicts an example diagram for updating a file cached in the distributed file cache system, in accordance with embodiments of the present invention.

Alternatively, in some embodiments, in FIG. 9, the request received from the user 910 may be intended to modify the file. FIG. 12 depicts an example diagram of a process 1200 for updating a file cached in the distributed file cache system 400 in accordance with embodiments of the present disclosure.

As depicted in FIG. 12, if the request (also referred to as "first request" in the following) sent from the user 910 to the client node 920 is intended to modify a file, the process 900 may be performed so as to obtain the file of the latest version (such as, the first version).

In response to the file of the first version being obtained, the client node 920 may generate 1201 a copy of the file of the first version and modify 1202 the copy locally based on the first request. For example, the client node 920 may determine, from the plurality of slices in the copy, one or more slices that need to be modified, and only modify the determined one or more slices based on the first request. Additionally, the client node 920 may transmit 1203, to the storage node 410-5, a second request to modify the file at the storage node 410-5 from the first version to a second version corresponding to the modified copy.

In response to receiving the second request from the client node 920, the storage node 410-5 may modify 1204 the file locally from the first version to the second version. The modification at the storage node 410-5 may fail if a conflict occurs. For example, if the storage node 410-5 receives two requests at the same time to modify the file from a same original version, the modification at the storage node 410-5 may fail. In some embodiments, in response to failure of the modification at the storage node 410-5, the storage node 410-5 may transmit 1205, to the client node 920, a notification indicating that the second request is rejected. In response to receiving the notification from the storage node 410-5, the client node 920 may remove 1206 the modified copy from the client node 920. Alternatively, or in addition, the client node 920 may also return to the user 910 a response indicating that the first request to modify the file is rejected (not shown in FIG. 12). It can be seen that the temporary copy maintained in the client node 920 enables reverting back to the original state if the modification is rejected by the storage node. Further, the file of the old version can still be shared when being modified.

Alternatively, in some embodiments, in response to success of the modification at the storage node 410-5 (i.e., no conflict occurs), the storage node 410-5 may generate 1207 version information (also referred to as "second version information") indicating that the file is modified from the first version to the second version by the client node 920. Then, the storage node 410-5 may record 1208 the second version information into the blockchain 720.

In some embodiments, the second version information may be recorded as a new transaction. For example, the transaction may include the following information: the URL of the file, the first and second versions of the file, a timestamp at which the modification was made, and/or the signature of the client node 920 which modifies the file. The new transaction may be broadcasted to all of the nodes 410 associated with the blockchain 720. When a node in the blockchain 720 discovers the new transaction, a verification contract will be triggered at the node to verify whether blocks in the blockchain 720 have conflicts on the same file, such as, whether there are two or more transactions that update the file from a same original version at the same time.

If the verification result at each node in the blockchain 720 indicates no conflict, the new transaction will be recorded into a newly generated block of the blockchain 720. As such, the second version information can be recorded into the blockchain 720. If the verification result at some node indicates that there is a conflict, the new transaction (that is, the second version information) will not be recorded into the blockchain 720.

Referring to FIG. 12, the client node 920 may determine 1209 if the second version information indicating that the file is modified from the first version to the second version by the client node 920 is recorded into the blockchain.

If the second version information is recorded into the blockchain successfully (i.e., the verification result indicates no conflict), the client node 920 may overwrite 1210 the file of the first version with the modified copy. Then, the client node 920 may update 1211 the slice information based on the modified copy and record the updated slice information at the client node 920. The updating of the slice information has been previously described in further detail with reference to FIGS. 5A-5C. Further, the client node 920 may also generate 1211 contact information indicating that the file of the second version is accessible from the client node 920, and record 1212 the generated contact information into the DHT 710.

Alternatively, if the client node 920 determines 1209 that there is a conflict e.g., there are two or more transactions that update the file from a same original version at the same time), the client node 920 may remove 1213 the modified copy from the client node 920. Alternatively, or in addition, the client node 920 may also return to the user 910 a response indicating that the first request to modify the file is rejected (not shown in FIG. 12).

Figure 13:
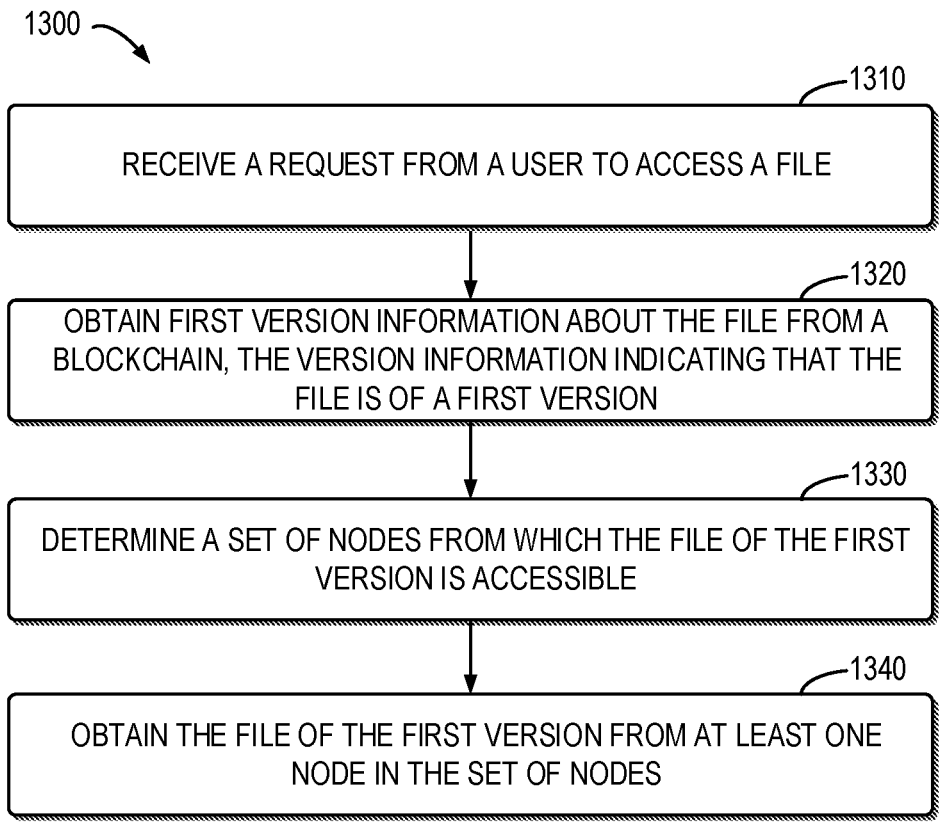
FIG. 13 depicts a flowchart of an example method for accessing a file cached in the distributed file cache system, in accordance with embodiments of the present invention.

FIG. 13 depicts a flowchart of a method 1300 for accessing a file cached in the distributed file cache system in accordance with embodiments of the present disclosure. For example, the method 1300 may be performed at a client node (such as, the client node 920 shown in FIG. 9). The method 1300 will be described in connection with FIG. 9. It is to be understood that the method 1300 may also comprise additional blocks (not shown) and/or may omit the illustrated blocks. The scope of the present disclosure described herein is not limited in this aspect.

At block 1310, the client node 920 receives, from a user, a request to access a file.

At block 1320, the client node 920 obtains first version information about the file from a blockchain associated with a plurality of nodes including the client node 920. The first version information indicates that the file is of a first version.

At block 1330, the client node 920 determines, from the plurality of nodes, a set of nodes from which the file of the first version is accessible based on the DHT associated with the plurality of nodes.

In some embodiments, the client node 920 may search the DHT for first contact information about the file, the first contact information indicating the set of nodes from which the file of the first version is accessible. In response to the first contact information being found in the DHT, the client node 920 may determine the set of nodes based on the first contact information.

In some embodiments, the plurality of nodes include a storage node for storing the file. In response to the first contact information being absent in the DHT, the client node 920 may add the storage node to the set of nodes.

At block 1340, the client node 920 obtains the file of the first version from at least one node in the set of nodes.

In some embodiments, the file of the first version includes a plurality of slices. The client node 920 may obtain a set of slice information about the file from the set of nodes, the slice information obtained from a node in the set of nodes indicating information about a set of slices included in the file at the node. The client node 920 may determine, from the set of nodes, the at least one node storing the plurality of slices based on the set of slice information and the first version. The client node 920 may obtain the plurality of slices from the at least one node.

Figure 14:
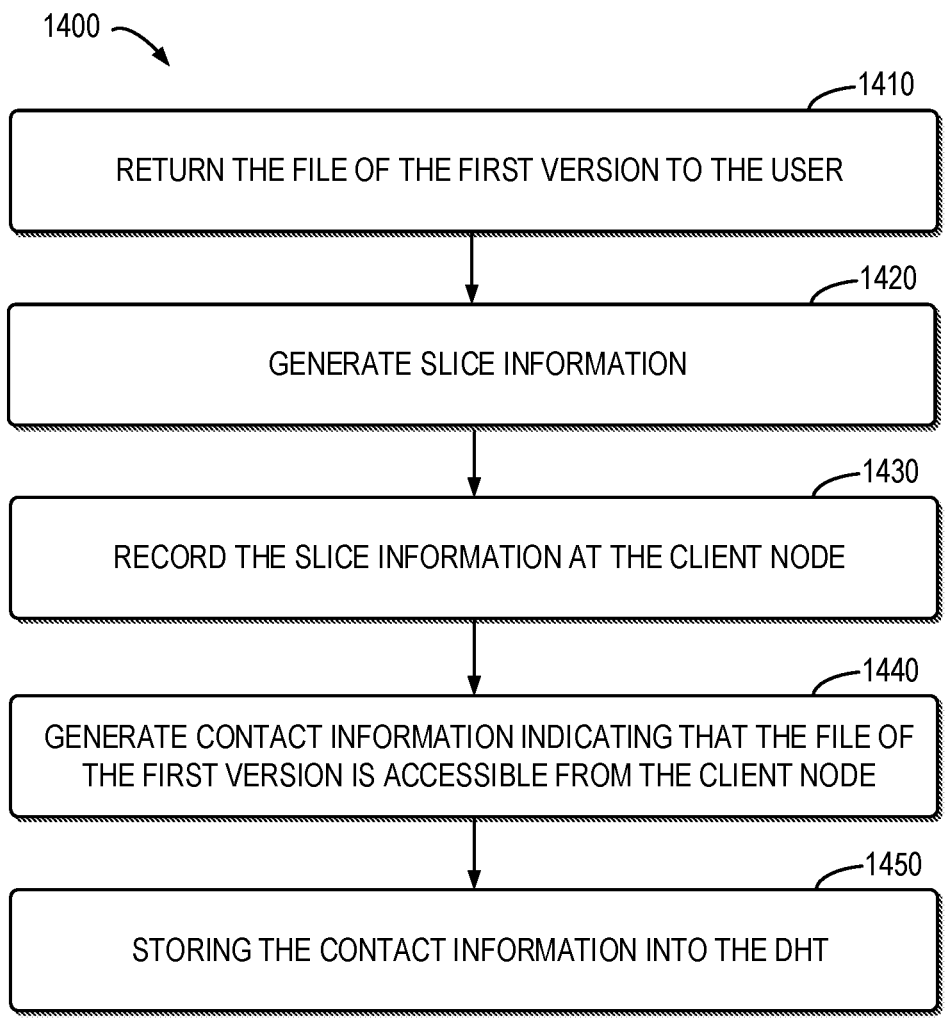
FIG. 14 depicts a flowchart of an example method for reading a file cached in the distributed file cache system, in accordance with embodiments of the present invention.

In some embodiments, the first request is to read the file. FIG. 14 depicts a flowchart of a method 1400 for reading a file cached in the distributed file cache system in accordance with embodiments of the present disclosure. For example, the method 1400 may be performed by the client node 920 subsequent to the method 1300. The method 1400 will be described in connection with FIG. 10. It is to be understood that the method 1400 may also comprise additional blocks (not shown) and/or may omit the illustrated blocks. The scope of the present disclosure described herein is not limited in this aspect.

At block 1410, in response to the file of the first version being obtained, the client node 920 returns the file of the first version to the user.

At block 1420, in response to the file of the first version including a plurality of slices being obtained, the client node 920 generates slice information about the plurality of slices.

At block 1430, the client node 920 records the slice information at the client node 920.

At block 1440, the client node 920 generates second contact information indicating that the file of the first version is accessible from the client node 920.

At block 1450, the client node 920 records the second contact information into the DHT.

Figure 15:
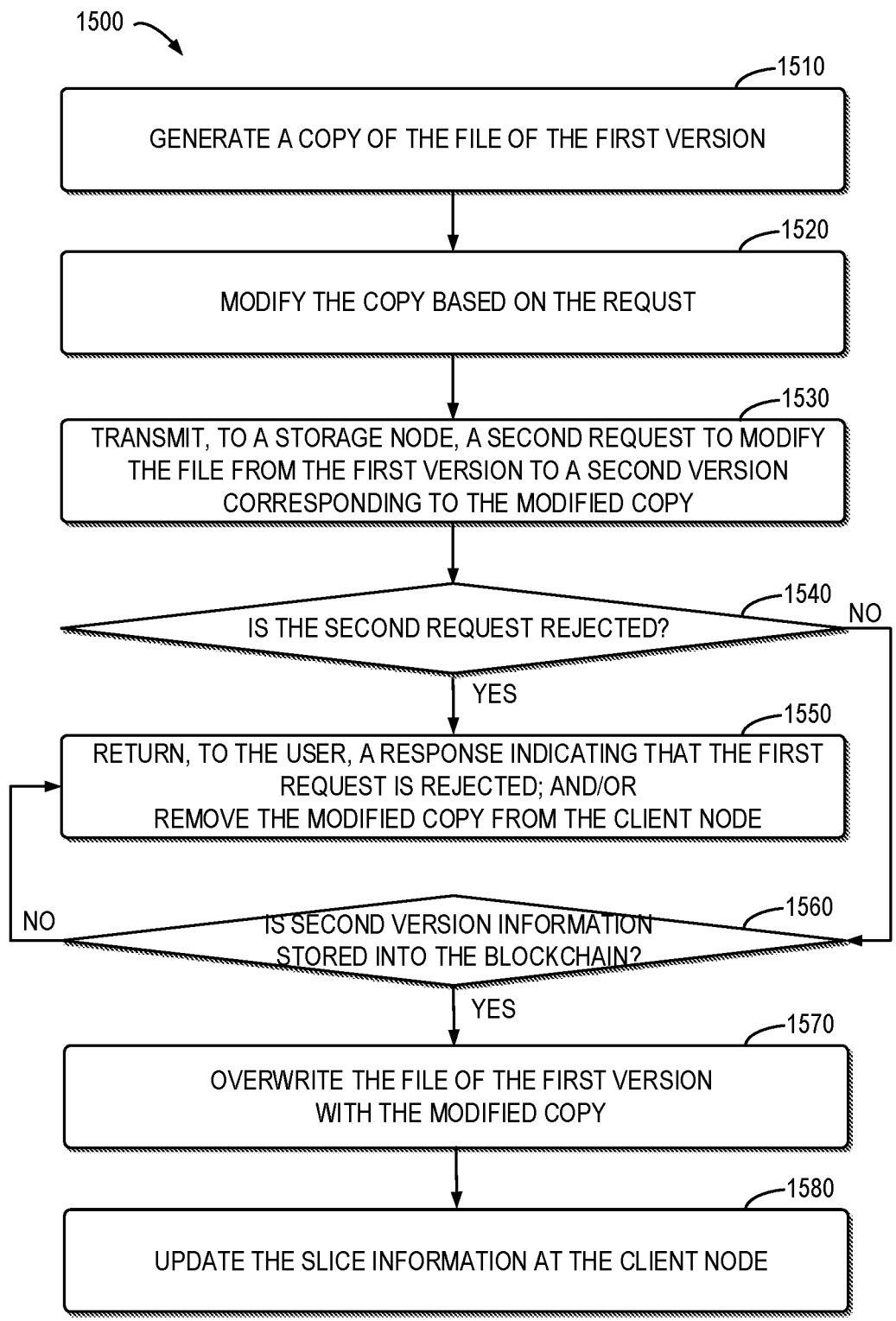
FIG. 15 depicts a flowchart of an example method for updating a file cached in the distributed file cache system, in accordance with embodiments of the present invention.

Alternatively, in some embodiments, the first request is to modify the file. FIG. 15 depicts a flowchart of a method 1500 for modifying a file cached in the distributed file cache system in accordance with embodiments of the present disclosure. For example, the method 1500 may be performed by the client node 920 subsequent to the method 1300. The method 1500 will be described in connection with FIG. 11. It is to be understood that the method 1500 may also comprise additional blocks (not shown) and/or may omit the illustrated blocks. The scope of the present disclosure described herein is not limited in this aspect.

At block 1510, in response to the file of the first version being obtained, the client node 920 generates a copy of the file of the first version.

At block 1520, the client node 920 modifies the copy. In some embodiments, the file of the first version includes a plurality of slices. The client node 920 may determine, one or more slices to be modified from the plurality of slices in the copy, and then modified the one or more slices.

At block 1530, the client node 920 transmits, to a storage node for storing the file, a second request to modify the file from the first version to a second version corresponding to the modified copy.

In some embodiments, in response to receiving the second request from the client node 920, the storage node may modify the file at the storage node from the first version to the second version corresponding to the modified copy. In response to failure of the modification at the storage node, the storage node transmits a notification indicating that the second request is rejected to the client node 920. In response to success of the modification at the storage node, the storage node may generate second version information indicating that the file is modified from the first version to the second version by the client node 920. The storage node may record the second version information into the blockchain.

At block 1540, the client node 920 determines if the second request is rejected by the storage node.

In response to receiving from the storage node the notification indicating that the second request is rejected, at block 1550, the client node 920 returns, to the user, a response indicating that the first request is rejected. Alternatively, or in addition, at block 1550, the client node 920 may also remove the modified copy from the client node 920.

At block 1560, the client node 920 determines if the second version information indicating that the file is modified from the first version to the second version by the client node is recorded into the blockchain.

In response to the second version information being recorded into the blockchain, at block 1570, the client node 920 overwrites the file of the first version with the modified copy. Otherwise, the method 1500 proceeds to block 1550.

At block 1580, the client node 920 updates the slice information. In some embodiments, the client node 920 store first slice information about a plurality of slices in the file of the first version. In response to the file of the first version being overwritten with the modified copy, the client node 920 may generate second slice information based on the modified copy and replace the first slice information with the second slice information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
in response to determining that at least one client node obtains a first version of a file stored at a storage node, generating, by one or more processors, contact information indicating that the first version of the file is accessible from the storage node and the at least one client node;
determining, by the one or more processors, a distance of the at least one client node to the storage node;
recording, by the one or more processors, the contact information into a distributed hash table associated with a plurality of nodes including the storage node and the at least one client node;
generating, by the one or more processors, a respective route table for each of the plurality of nodes associated with the distributed hash table, wherein the respective route table of each of the plurality of nodes includes a record of respective nearby nodes that include the first version of the file based at least in part on distance;

generating, by the one or more processors, first version information indicating that the file is of the first version, wherein a version of the file indicates an update to the file; and recording, by the one or more processors, the first version information into a blockchain associated with the plurality of nodes, wherein the first version information is divided into a plurality of slices incorporating slice information comprising versions of the plurality of slices corresponding to the first version, checksums of the plurality of slices and start positions and end positions of the plurality of slices in the file of the first version.

2. The method of claim 1, wherein recording the contact information further comprises:

determining, by the one or more processors, a node from the plurality of nodes, such that the distance from the node to the storage node is below a threshold distance; and recording, by the one or more processors, the contact information into the distributed hash table at the node.

3. The method of claim 1, further comprising:

generating, by the one or more processors, slice information about the plurality of slices; and recording, by the one or more processors, the slice information at the storage node and the at least one client node.

4. The method of claim 1, further comprising:

receiving, by the one or more processors, a request from a client node to modify the first version of the file, the client node being included in the plurality of nodes; and modifying, by the one or more processors, the file at the storage node from the first version of the file to a second version of the file based on the request.

5. The method of claim 4, further comprising:

in response to failure of the modification, transmitting, by the one or more processors, a notification indicating that the request is rejected to the client node.

6. The method of claim 4, further comprising:

in response to success of the modification, generating, by the one or more processors, second version information indicating that the file is modified from the first version of the file to the second version of the file by the client node; and recording, by the one or more processors, the second version information into the blockchain.

7. A method comprising:

receiving, by one or more processors, a first request to access a file from a user at a client node;

obtaining, by the one or more processors, first version information about the file from a blockchain associated with a plurality of nodes including the client node, the first version information indicating that the file is of a first version, wherein the first version corresponds to the file and the first version information is divided into a plurality of slices incorporating slice information comprising versions of the plurality of slices corresponding to the first version, checksums of the plurality of slices, and start positions and end positions of the plurality of slices in the file of the first version, wherein obtaining first version information about the file further comprises:

obtaining, by the one or more processors, a list of levels of clusters of a distributed hash table associated with the plurality of nodes, wherein the levels of clusters are based at least in part on a round trip time between two nodes in each level of clusters;

initiating, by the one or more processors, a search for first contact information of the file based at least in part on a level of a cluster of the list of levels of clusters, wherein initiating the search, further comprises:

determining, by the one or more processors, a level of the list of levels of clusters to start the search;

determining, by the one or more processors, a set of nodes from which the file of the first version is accessible based on the distributed hash table associated with the plurality of nodes, the set of nodes being included in the plurality of nodes; and obtaining, by the one or more processors, the file of the first version from at least one node in the set of nodes.

8. The method of claim 7, wherein determining the set of nodes comprises:

searching, by the one or more processors, the distributed hash table for the first contact information of the file, the first contact information indicating the set of nodes from which the file of the first version is accessible; and in response to the first contact information being found in the distributed hash table, determining, by the one or more processors, the set of nodes based on the first contact information.

9. The method of claim 8, wherein the plurality of nodes include a storage node for storing the file, and determining the set of nodes further comprises:

in response to the first contact information being absent in the distributed hash table, adding, by the one or more processors, the storage node to the set of nodes.

10. The method of claim 7, wherein the file of the first version includes a plurality of slices, and obtaining the file of the first version comprises:

obtaining, by the one or more processors, a set of slice information about the file from the set of nodes, the slice information obtained from a node in the set of nodes indicating information about a set of slices included in the file at the node;

determining, by the one or more processors, the at least one node having the plurality of slices based on the set of slice information and the first version; and obtaining, by the one or more processors, the plurality of slices from the at least one node.

11. The method of claim 7, wherein the first request is to read the file, and the method further comprises:

in response to the file of the first version including a plurality of slices being obtained, generating, by the one or more processors, slice information about the plurality of slices; and recording, by the one or more processors, the slice information at the client node.

12. The method of claim 11, further comprising:

generating, by the one or more processors, second contact information indicating that the file of the first version is accessible from the client node; and recording, by the one or more processors, the second contact information into the distributed hash table.

13. The method of claim 7, wherein the first request is to modify the file, and the method further comprises:

in response to the file of the first version being obtained, generating, by the one or more processors, a copy of the file of the first version; and modifying, by the one or more processors, the copy.

14. The method of claim 13, wherein the file of the first version includes a plurality of slices, and modifying the copy comprises:

determining, by the one or more processors, one or more slices to be modified from the plurality of slices in the copy; and modifying, by the one or more processors, the one or more slices.

15. The method of claim 13, wherein the plurality of nodes include a storage node for storing the file, and the method further comprises:

transmitting, by the one or more processors, a second request to modify the file from the first version to a second version to the storage node, the second version corresponding to the modified copy; and in response to receiving, by the one or more processors, from the storage node a notification indicating that the second request is rejected, returning, by the one or more processors, a response indicating that the first request is rejected to the user; and removing, by the one or more processors, the modified copy from the client node.

16. The method of claim 15, further comprising:

in response to second version information indicating that the file is modified from the first version to the second version by the client node being recorded into the blockchain, overwriting, by the one or more processors, the file of the first version with the modified copy.

17. The method of claim 16, wherein the client node records first slice information about a plurality of slices in the file of the first version, and the method further comprises:

in response to the file of the first version being overwritten with the modified copy, generating, by the one or more processors, second slice information based on the modified copy; and replacing, by the one or more processors, the first slice information with the second slice information.

18. A computer system comprising:

one or more computer processors;

one or more computer readable storage media; and program instructions stored on the computer readable storage media for execution by at least one of the one or more processors, the program instructions comprising:

in response to determining that at least one client node obtains a first version of a file stored at a storage node, program instructions to generate contact information indicating that the first version of the file is accessible from the storage node and the at least one client node;

program instructions to determine a distance of the at least one client node to the storage node;

program instructions to record the contact information into a distributed hash table associated with a plurality of nodes including the storage node and the at least one client node;

program instructions to generate a respective route table for each of the plurality of nodes associated with the distributed hash table, wherein the respective route table of each of the plurality of nodes includes a record of respective nearby nodes that include the first version of the file based at least in part on distance;

program instructions to generate first version information indicating that the file is of the first version, wherein a version of the file indicates an update to the file; and program instructions to record the first version information into a blockchain associated with the plurality of nodes, wherein the first version information is divided into a plurality of slices incorporating slice information comprising versions of the plurality of slices corresponding to the first version, checksums of the plurality of slices, and start positions and end positions of the plurality of slices in the file of the first version.

19. The computer system of claim 18, further comprising program instructions, stored on the computer readable storage media for execution by at least one of the one or more processors, to:

generate slice information about the plurality of slices; and record the slice information at the storage node and the at least one client node.

20. The computer system of claim 18, further comprising program instructions, stored on the computer readable storage media for execution by at least one of the one or more processors, to:

receive a request from a client node to modify the first version of the file, the client node being included in the plurality of nodes; and modify the file at the storage node from the first version of the file to a second version of the file based on the request.

* * * * *